US008803876B2

(12) United States Patent
Bohan et al.

(10) Patent No.: US 8,803,876 B2
(45) Date of Patent: Aug. 12, 2014

(54) HARDWARE ACCELERATED GRAPHICS FOR NETWORK ENABLED APPLICATIONS

(75) Inventors: Ronan Bohan, Bray (IE); John Hamill, Dublin (IE); Davide Pasetto, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/314,699

(22) Filed: Dec. 8, 2011

(65) Prior Publication Data

US 2012/0154389 A1  Jun. 21, 2012

(30) Foreign Application Priority Data

Dec. 15, 2010  (EP) ..................................... 10195227

(51) Int. Cl.
*G06T 15/00* (2011.01)
(52) U.S. Cl.
USPC ........................................................ 345/419
(58) Field of Classification Search
USPC ........................................................ 345/419
See application file for complete search history.

(56) References Cited

PUBLICATIONS

Shi, Weidong, et al. "Scalable support for 3D graphics applications in cloud." Cloud Computing (CLOUD), 2010 IEEE 3rd International Conference on. IEEE, 2010.*
Weidong, Shi et al., "Scalable Support for 3D Graphics Applications in Cloud", Cloud Computing, 2010 IEEE 3rd International Conference on, IEEE, Piscataway, New Jersey, USA, Jul. 5, 2010, pp. 346-353.
International Search Report and Written Opinion of the ISA dated Oct. 27, 2011—International Application No. PCT/EP2011/068869.

* cited by examiner

*Primary Examiner* — David Zarka
*Assistant Examiner* — Vu Nguyen
(74) *Attorney, Agent, or Firm* — Robert R. Williams

(57) ABSTRACT

A method and system are provided for providing hardware accelerated graphics for network enabled applications. The method includes providing a network enabled application on a host, the application requiring hardware accelerated graphics not provided on the host; providing a 3D library wrapper at the host for connection to a broker of 3D graphics rendering resources. The broker receives a request for 3D graphics rendering resources, and evaluates available rendering resources and allocates a selected 3D graphics rendering resource to the 3D library wrapper, in order to return final 2D rendered images to a client. The network enabled application may execute on a virtual machine on the host or on a terminal services session on the host and is accessed by a remote client.

20 Claims, 10 Drawing Sheets

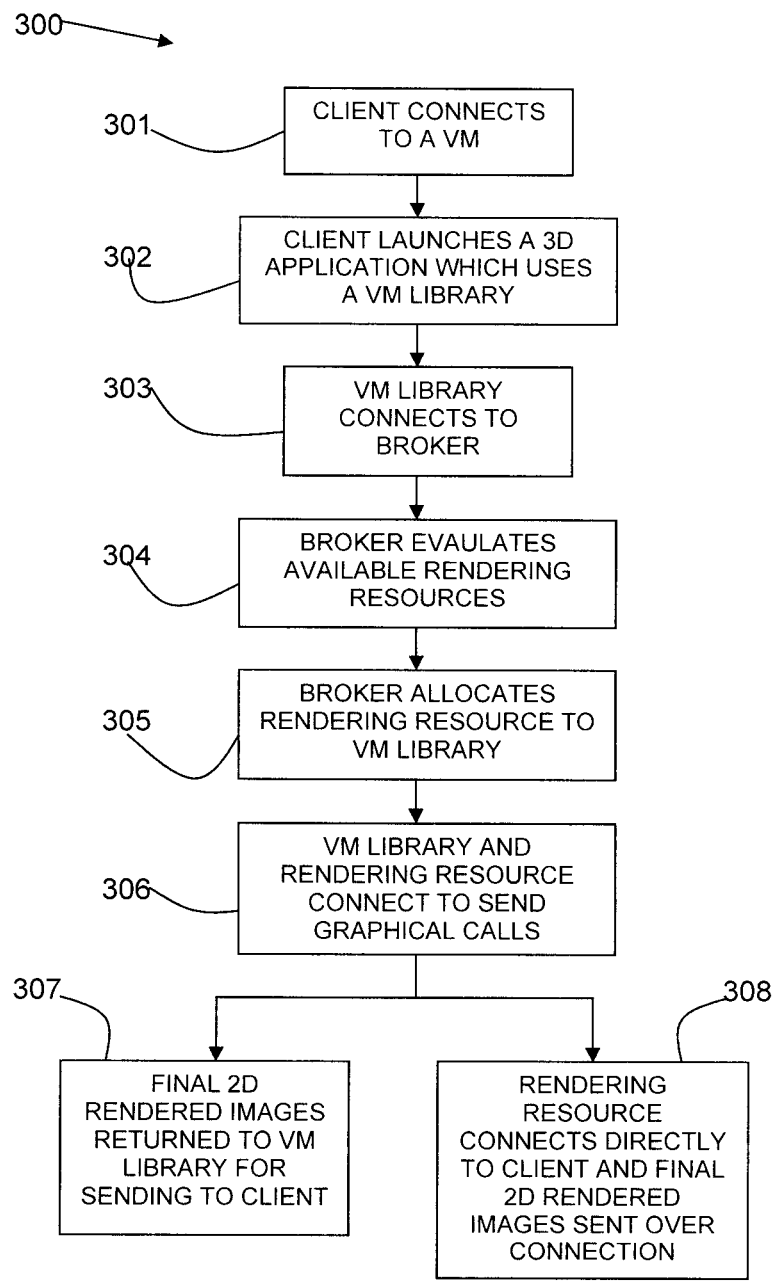

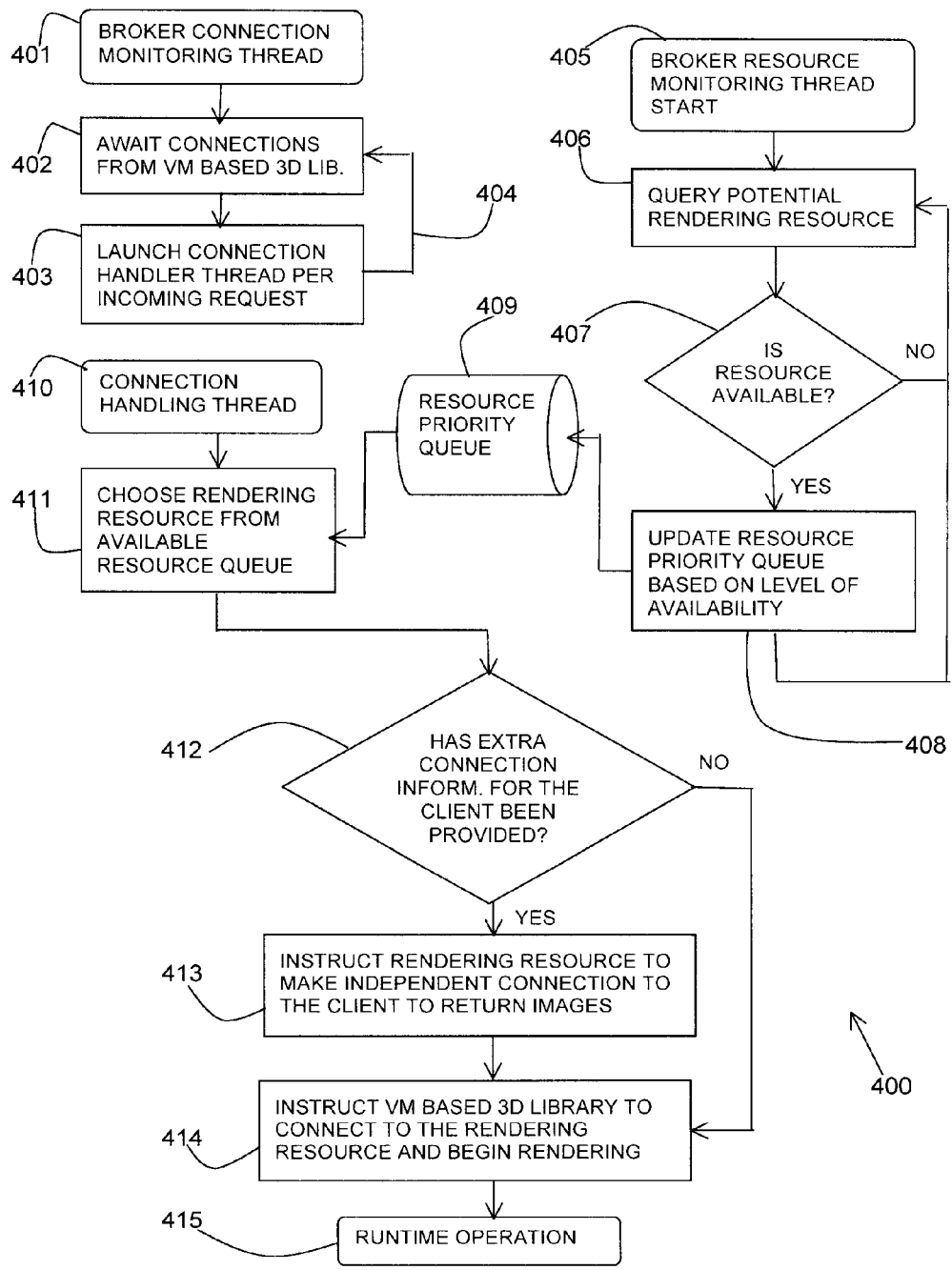

HARDWARE ACCELERATED GRAPHICS FOR NETWORK ENABLED APPLICATIONS

This invention relates to the field of hardware accelerated graphics. In particular, the invention relates to hardware accelerated graphics for network enabled applications.

"Cloud computing" is the consolidation of, traditionally workstation based, application workloads at a remote location such as a data centre. Cloud computing is network-based computing in which shared resources, software, and information are provided to computers and other devices on demand. A cloud includes applications running on operating systems in a virtual machine (VM) or may consist of applications run in a similar environment such as Microsoft Terminal Services (TS) (Microsoft is a trade mark of Microsoft Corporation in the United States, other countries or both). The benefit of cloud computing is that it provides centralised control and configuration of hardware and software, while also allowing ease of update and maximisation of resource and license usage.

3D graphics provide an enabling capability to represent complex data in a visual manner Many fields, such as scientific computing, medical imaging, computer added design (CAD), product life-cycle management (PLM), and oil and gas exploration, make use of 3D graphics extensively. Access to 3D graphics hardware, allowing complex scenes and models to be rendered without extensive CPU (central processor unit) usage, is provided through standardized 3D application programming interfaces (APIs) such as OpenGL (Open Graphics Library) standard (OpenGL is a trade mark of Khronos Group) and Microsoft's DirectX (DirectX is a trade mark of Microsoft Corporation), amongst others.

Historically, virtual machines have had limited support for 3D graphics rendering. Software rendering of complex 3D is very CPU intensive and can swamp the virtualization host. Techniques that do exist are limited to accessing the local hardware on the host and so provide very limited scalability. As such the categories of 3D applications previously described have typically been excluded from running in such an environment.

According to a first aspect of the present invention there is provided a method for providing hardware accelerated graphics for network enabled applications, comprising: providing a network enabled application on a host, the application requiring hardware accelerated graphics not provided on the host; providing a 3D library wrapper at the host for connection to a broker of 3D graphics rendering resources; receiving a request at the broker for 3D graphics rendering resources; and the broker evaluating available 3D graphics rendering resources and allocating a 3D graphics rendering resource to the 3D library wrapper, in order to return final 2D rendered images back to a remote client.

According to a second aspect of the present invention there is provided a computer software product for providing hardware accelerated graphics for network enabled applications, the product comprising a computer-readable storage medium having computer readable program code embodied therewith, the computer readable program code configured to: provide a network enabled application on a host, the application requiring hardware accelerated graphics not provided on the host; provide a 3D library wrapper at the host for connection to a broker of 3D graphics rendering resources; receive a request at the broker for 3D graphics rendering resources; and evaluate available 3D graphics rendering resources and allocate a selected 3D graphics rendering resource to the 3D library wrapper, in order to return final 2D rendered images to a remote client.

According to a third aspect of the present invention there is provided a method of providing a service to a customer over a network for providing hardware accelerated graphics for network enabled applications, the service comprising: providing a network enabled application on a host, the application requiring hardware accelerated graphics not provided on the host; providing a 3D library wrapper at the host for connection to a broker of 3D graphics rendering resources; receiving a request at the broker for 3D graphics rendering resources; and the broker evaluating available 3D graphics rendering resources and allocating a selected 3D graphics rendering resource to the 3D library wrapper, in order to return final 2D rendered images to a remote client.

According to a fourth aspect of the present invention there is provided a system for providing hardware accelerated graphics for network enabled applications, comprising: a host having an application requiring hardware accelerated graphics not provided on the host and a 3D library wrapper for the application; one or more 3D graphics rendering resources provided independently of the host; a broker for evaluating and allocating a selected 3D graphics rendering resource to the 3D library wrapper for the application, in order to return final 2D rendered images to a remote client.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIGS. 3A and 3B are a flow diagram and system diagram with flow showing a method in accordance with a preferred embodiment of the present invention;

FIGS. 4A and 4B are flow diagrams of methods in accordance with preferred embodiments of the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A described method and system allow the cloud benefits of consolidation of hardware and software to be leveraged in the 3D application space.

A cloud is typically a collection of physical servers located at a single location, or multiple locations (linked by a fast network), that host multiple virtual machines (VMs). These virtual machines may even be migrated from one physical host to another (for example, in the case of hardware failure) without any interruption of service from a user's perspective. The use of virtual machines allows multiple workloads to be processed concurrently making better use of system resources, like CPU (central processing unit) or memory, and still providing physical isolation between workloads.

A terminal services (TS) server, similarly, hosts multiple user sessions on a single system. Remote access occurs in an analogous fashion to the case of a system hosting multiple virtual machines. Instead of a user connecting to an individual remote VM, the user connects to a remote TS session running on a single server machine.

For the purposes of this document the term "cloud" can refer both to remote systems hosting multiple virtual machines and systems hosting multiple terminal services sessions.

The described method and system enable a combination of providing scalable GPU (Graphics Processing Unit) acceleration to cloud based systems with remote access to 3D imagery. An arbitrarily large amount of graphics resources may be made available to cloud-based 3D applications depending on need, and the use of compression and remote streaming of the resultant 3D images simulates a local-application user experience.

The described method and system provide hardware accelerated 3D graphics to applications running in a cloud-type remote system, also referred to as network enabled applications. This allows the combination of the advantages of traditional dedicated workstation for 3D application loads with the scalability and flexibility that a cloud deployment strategy provides.

Figure 1:
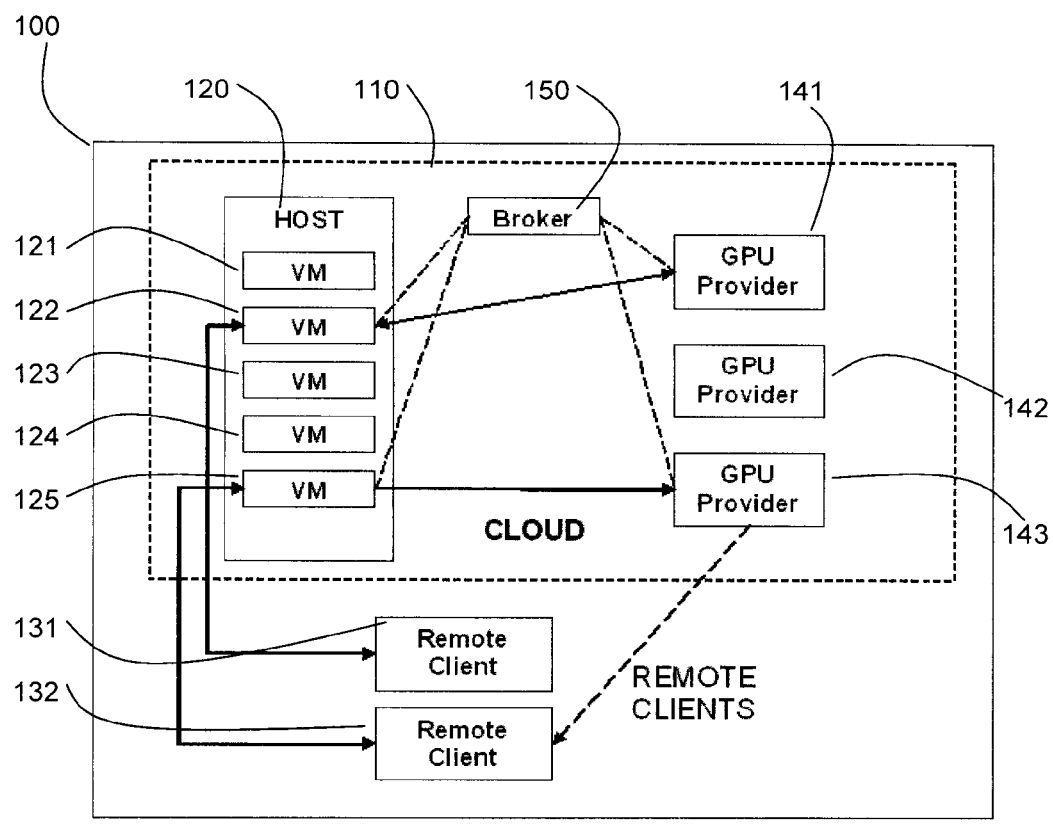
FIG. 1 is a block diagram of a system in accordance with a preferred embodiment of the present invention.

Referring to FIG. 1, a block diagram shows the described system 100. A cloud-type remote environment 110 is provided. The cloud environment 110 is typically a collection of physical servers located at a single location or multiple locations linked by a fast network, that host multiple virtual machines or terminal server sessions. FIG. 1 shows a physical host 120 including multiple virtual machines (VMs) or terminal services (TS) sessions 121-125.

Remote clients 131, 132 are embodiments of remote clients comprising a thin client remote access device and remote access software. For example, the remote client 131, 132 may be a VNC (virtual network computing) client or Microsoft Remote Desktop Protocol (RDP) client running on a laptop or smart telephone. From a remote client's perspective they may access an entire remote desktop hosted on a remote machine or simply a single application that is exported by the remote machine. A user may access the cloud remotely through some method such as a dedicated remote client or a web-page based portal. This remote client access is typically lightweight and does not require substantial CPU power or memory on behalf of the remote client, nor does it require 3D graphics hardware on the part of the remote client.

The described system 100 includes in the cloud environment 110 one or more graphic processing unit (GPU) providers 141-143 shown in FIG. 1, also referred to as 3D graphics rendering resources or graphics servers, (also shown as "rendering resource" 141-144 in FIG. 3B) which provide actual 3D graphics hardware and handle graphics processing tasks.

The described system 100 also includes a broker 150 provided in the cloud environment 110 which performs appropriate resource assignment between the VMs or TS sessions 121-125 and the GPU providers 141-143.

The components of the cloud environment 110 may be located close together in a data-centre or at separate locations connected by a high-speed network. Some components may also be located within the same physical hardware as other components as appropriate.

Virtualized graphics hardware in the form of the GPU providers 141-143 is provided in the cloud environment 110 allowing 3D applications to run in the cloud from the VMs or TS sessions 121-125.

The decoupling of accelerated 3D rendering in the GPU providers 141-143 from the cloud host 120 allows for unlimited scalability, unlike other systems which are limited to the resources that can be attached directly to the host machine.

Figure 2:
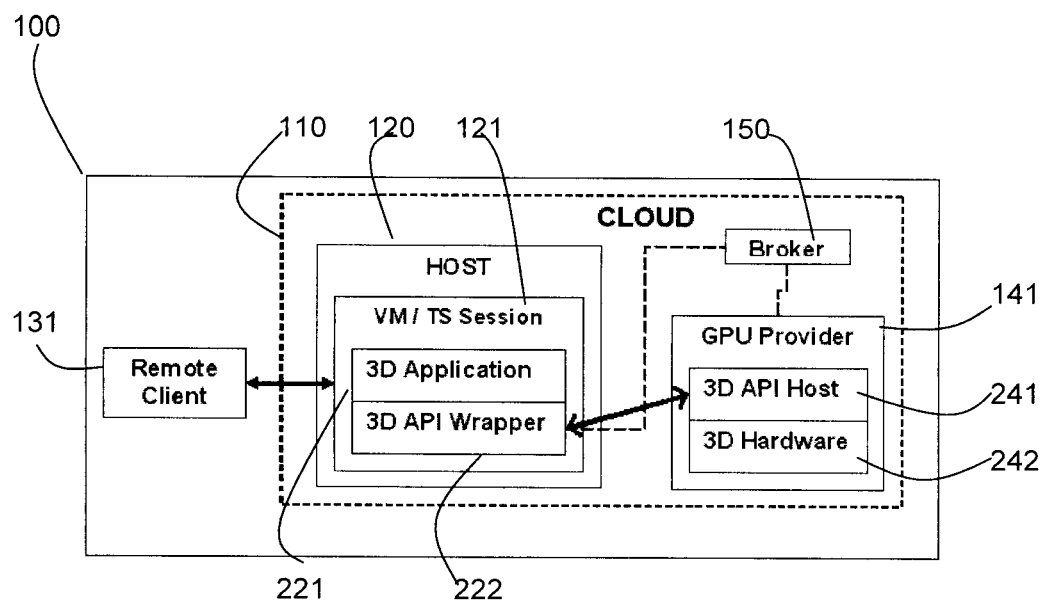
FIG. 2 is a block diagram showing further details of the system of FIG. 1 in accordance with a preferred embodiment of the present invention.

Referring to FIG. 2, a block diagram shows a detail of the system 100 of FIG. 1. A VM/TS session 121 is shown on a host 120 in a cloud environment 110. The VM/TS session 121 includes a 3D application 221 in the form of a network enabled application and a 3D API wrapper library (also referred to as a VM library) 222 providing a proxy graphics library. A remote client 131 may access the 3D application 221. The 3D API wrapper library 222 is a proxy graphics library that calls the broker 150 to access a selected GPU provider 141.

The selected GPU provider 141 in the cloud environment 110 includes a 3D API host 241 and 3D hardware 242. The broker 150 provides resource assignment between the VM/TS session 121 and the selected GPU provider 141.

The virtualized 3D hardware 204 of the selected GPU provider 141 is accessed via a proxy graphics library in the form of a 3D API wrapper library 222 at the VM/TS session 121.

Remote access by a remote client 131 to the 3D content is provided by compressing and streaming pre-rendered 2D images to a thin client 131 embodiment of remote client 131. The combination of these components resolves the issue of scalable remote access to 3D applications hosted in cloud environments.

3D graphics hardware converts 3D screen descriptions into 2D images for display. This feature is utilized to generate the 2D images of the 3D scene on the selected GPU provider and a compressed stream of 2D images is sent to the remote client.

The described system provides the ability to route final image data directly from the GPU providers to the remote client as marshaled by the broker system. This overcomes a critical problem of a network bottleneck forming at the virtual machine host stage due to the large number of rendered images (each a large block of data, for example, 3 MB per frame for an uncompressed image of 1024×768 pixels, typically running at 30-60 frames per second (fps)) returning from the GPU providers to be sent on to the remote clients. Using the broker to direct and marshal communications allows this bottleneck to be avoided and makes large scalability practical.

The described system covers both the provision of 3D hardware resources to virtual machines or terminal server sessions that normally do not have access to 3D hardware acceleration, and interactive remote access to the images generated by that 3D hardware.

The described method and system are applicable to all operating systems and all 3D accelerated graphics APIs (OpenGL & Direct3D etc. (Direct3D is a trade mark of Microsoft Corporation)). It is also possible to operate in a heterogeneous environment—such as a Microsoft Windows VM (Windows is a trade mark of Microsoft Corporation) making use of a Linux (Linux is a trade mark of Linus Torvalds) based GPU provider for rendering, all being accessed from a remote session on any form of thin client. Additionally the described method and system are applicable to GPU based acceleration APIs (such as CUDA (Compute Unified Device Architecture) (CUDA is a trade mark of NVIDIA Corporation)/OpenCL (OpenCL is a trade mark of Khronos Group)/DirectX11 Compute) as well as pure 3D graphics APIs.

Platform independence is also provided by the described method and system. By allowing 3D graphics API calls to be modified to a neutral format by the wrapper library and the GPU provider, also heterogeneous configuration of operating systems is allowed. This allows any operating system to render using any other operating system as its graphics provider.

The described method and system are also applicable to any current virtualization technique, be it Type 1 & Type 2 Hypervisor and also Microsoft Terminal Services Sessions. The described method and system operate in an identical fashion whether a virtual machine session or a terminal services session is involved.

Multiple remote client connection protocols are supported, for example Virtual Network Computing (VNC) and Remote Desktop Protocol (RDP). Final 2D images of the 3D scene are returned via a separate network channel and finally composited on the remote client side. There is no particular reliance on features of the method used for remote access.

Most importantly, no changes are required to applications that make use of the described method and system. The described proxy wrapper library ensures the entire process is completely transparent to the application.

A remote client 131 connects to a remote system 120 hosted within a cloud environment 110. The remote client 131 interacts with a 3D application 221 running remotely. This appears effectively as a local application from the client's perspective.

The 3D application 221 hosted on the VM or TS session 121 executes as though it was running on a stand-alone system. When 3D graphics calls are to be made the 3D application 221 will attempt to load a 3D library (such as an OpenGL32.DLL on Microsoft Windows or libGL.so on Linux) and make graphics function calls. These calls would normally be routed via a driver to appropriate 3D hardware for rendering on a display. Instead, the described system 100 contains a wrapper library 222 that is used to intercept all potential rendering calls, convert them to a platform neutral format, and execute them at an appropriate location.

The wrapper library 222 makes contact with the broker 150 over a network connection. The broker 150 queries the collection of GPU providers 141-143 (FIG. 1) for a suitable resource. Particular requirements may be supplied to the broker 150, in particular information such as the IP address of the remote client 131, or the expected GPU memory requirements.

The broker 150 may use this information to allocate (select) an appropriate GPU provider 141 (rendering resource 141 in FIG. 3B), in conjunction with an allocation strategy such as "round-robin" or a more complicated strategy based on resources allocation and performance metrics (such as GPU memory usage, GPU compute load, current GPU core temperature etc.). Once a suitable GPU provider is located, the library wrapper 222 is instructed to connect to the appropriate individual selected GPU provider 141.

The broker 150 can direct the selected GPU provider 141 to establish a direct connection to the remote client 131 to transfer finished images, thus bypassing the VM/TS session 121 and preventing a network bottleneck occurring at the host 120.

The avoidance of this traditional bottleneck (whereby huge amounts of data must be routed through the host), allows the described system to grow to cloud scale. This also dramatically improves latency, though faster delivery of frames, thereby providing a more interactive and responsive user experience.

Once this connection is made the 3D application makes rendering calls as normal. These calls are transferred over the network to the associated selected GPU provider 141. A high-speed network link allows each rendering call to occur remotely with low latency. The calls may be converted to a platform-neutral format to allow heterogeneous configuration of operating systems in the system, such as a Microsoft Windows XP Virtual Machine making use of a Linux based GPU provider.

Once the calls are received by the selected GPU provider 141, they are sent to the local 3D hardware 242 as though they originated from an application running on the selected GPU provider 141. When the current 3D image frame is finished, that completed image is either sent directly to the remote client 131 from the selected GPU provider 141 or returned via the network to the wrapper library 222 in the VM/TS session 121 for local display. This communication is managed by the broker 150 to ensure the VM host 120 is not overwhelmed with large quantities of returning image data, that is simply passed on to the remote client 131.

The rendered 3D image is compressed, if desired, to save bandwidth, and sent over a network channel to the remote client 131 where it is decoded and displayed locally. An existing remote access software (for example, VNC or RDP) may be used to handle 2D data, such as menus and window frames, with the described components handling all the 3D content. The final 3D image is integrated seamlessly with the 2D content displayed normally.

The user sends mouse and keyboard events from the remote client 131 to the remote 3D application 221 where they are executed appropriately. More imagery is generated and returned in response to the user's input. With image compression (similar to Internet Video Streaming) and moderate network bandwidth, full interactive access can be achieved with 3D applications, whilst keeping the benefits of cloud computing.

Upon disconnection of the remote client 131 or closing of the 3D application 221, the selected GPU provider 141 resources are freed and the broker 150 is signalled to indicate that those resources are now fully available.

If local console access (i.e. physical access from the VM host machine) is required to virtual machines, for example for administration purposes, then the final images must be routed through the VM so it can be displayed on the local console. In a typical cloud deployment most users are remote so the system of a direct connection from the selected GPU provider 141 is preferable, as it avoids creating a bottleneck, but does not facilitate local access. The broker 150 allows both options to exist seamlessly in the cloud system and to switch a particular image stream instance back and forth between routing through the VM 121 to the remote client 131 and a direct connection from the selected GPU provider 141, as required.

Live migration of running virtual machines is also facilitated by the broker 150, as the connection between the Virtual Machine 121 and the selected GPU provider 141 can be maintained by the broker 150 even if the VM 121 moves to a different host 120. This would not be possible without the separation of computer and graphics resources described.

Figure 3B:
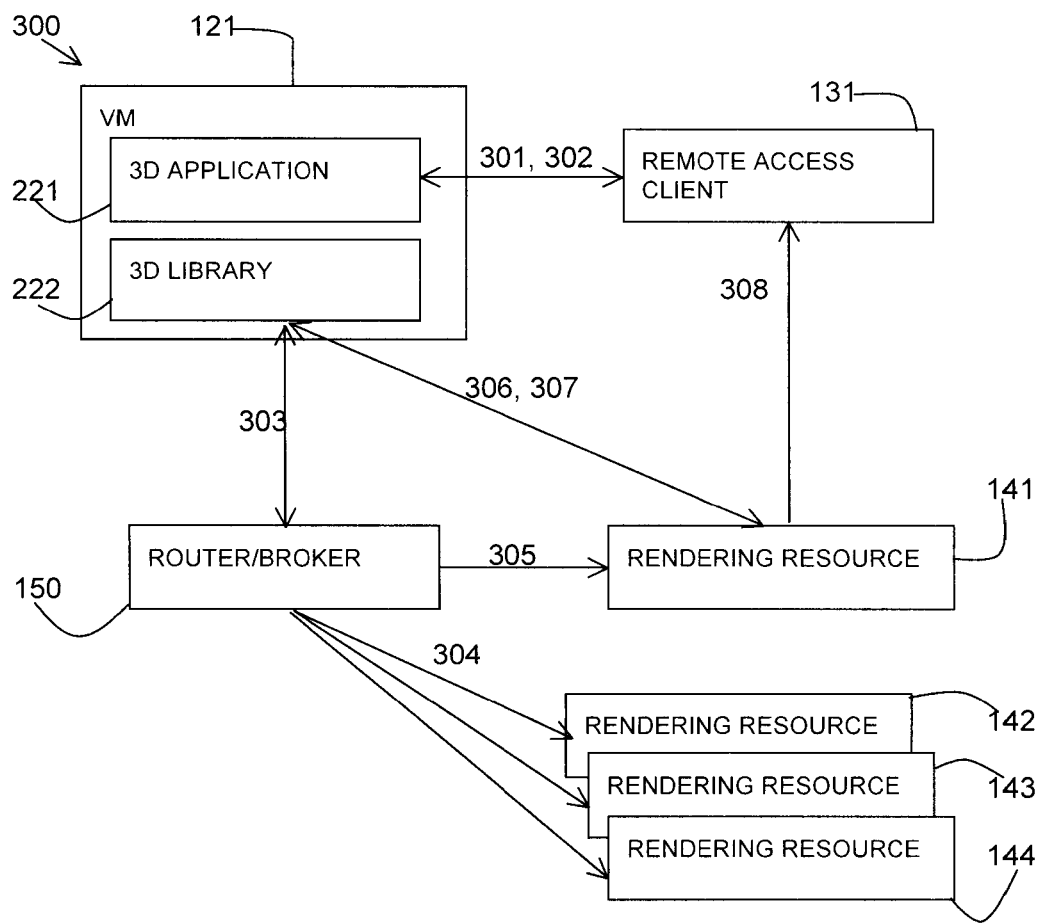

Referring to FIGS. 3A and 3B, a flow 300 is illustrated of connections of the described method. FIG. 3A shows a flow diagram with connection steps. FIG. 3B shows the connection steps between the components as introduced in FIGS. 1 and 2.

The flow 300 includes a remote client 131 connecting 301 to a VM 121 and launching 302 a 3D application 221 which uses a virtualized 3D library 222 (referred to as the VM library). VM library 222 connects 303 to the broker 150. The broker 150 evaluates 304 available 3D graphics rendering resources 141-144 and allocates 305 one 141 to the VM library 222. The VM library 222 and the selected 3D graphics rendering resource 141 connect 306 to each other to send graphical calls. In one option, final rendered images are returned 307 to the VM library 222 for sending to the remote client 131. In another option, the selected 3D graphics rendering resource 141 connects 308 directly to the remote client 131 and final rendered images are sent over this connection. The broker may alter the connection topology upon request from the VM library (typically in response to a remote client request).

Figure 4B:
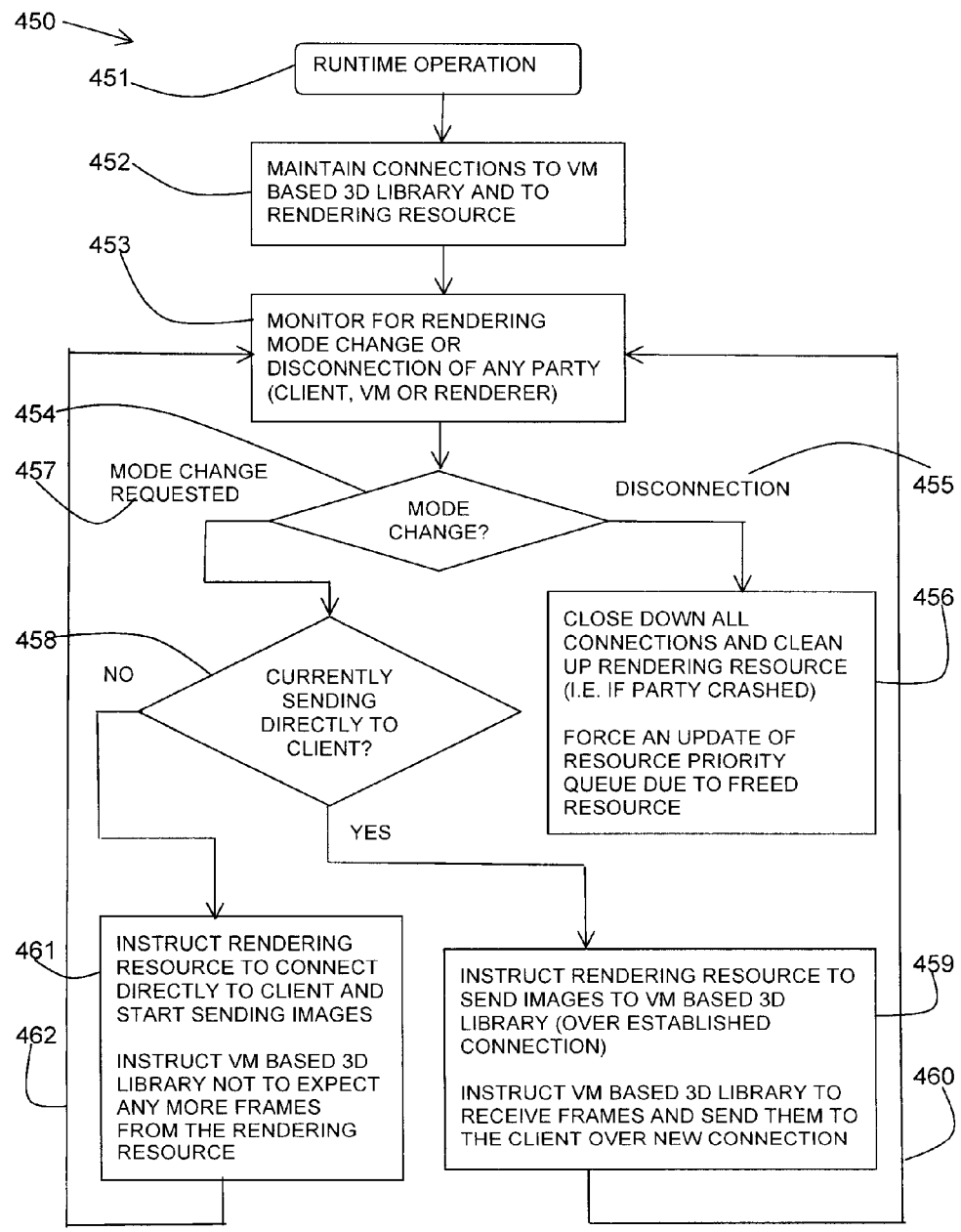

Referring to FIGS. 4A and 4B, flow diagrams 400, 450 show the operation of broker during resource monitoring and setup in FIG. 4A and during runtime in FIG. 4B.

Referring to FIG. 4A, the flow diagram 400 shows a broker connection monitoring thread 401. Connections are awaited 402 from the host based 3D library. A connection handler thread is launched 403 per incoming thread. The monitoring thread loops 404.

A broker resource monitoring thread 405 is started. Potential 3D graphics rendering resources are queried 406. It is determined 407 if a resource is available. If not the method loops to querying 406 potential 3D graphics rendering resources. If resource is available, update 408 resource priority queue 409 based on level of availability. The method continues to query 406 potential 3D graphics rendering resources.

A connection handling thread 410 is shown. A selected 3D graphics rendering resource is chosen 411 from the resource priority queue 409. It is determined 412 if extra connection information has been provided for the remote client. If so, the selected 3D graphics rendering resource is instructed 413 to make an independent connection to the remote client to return images.

Figure 5:
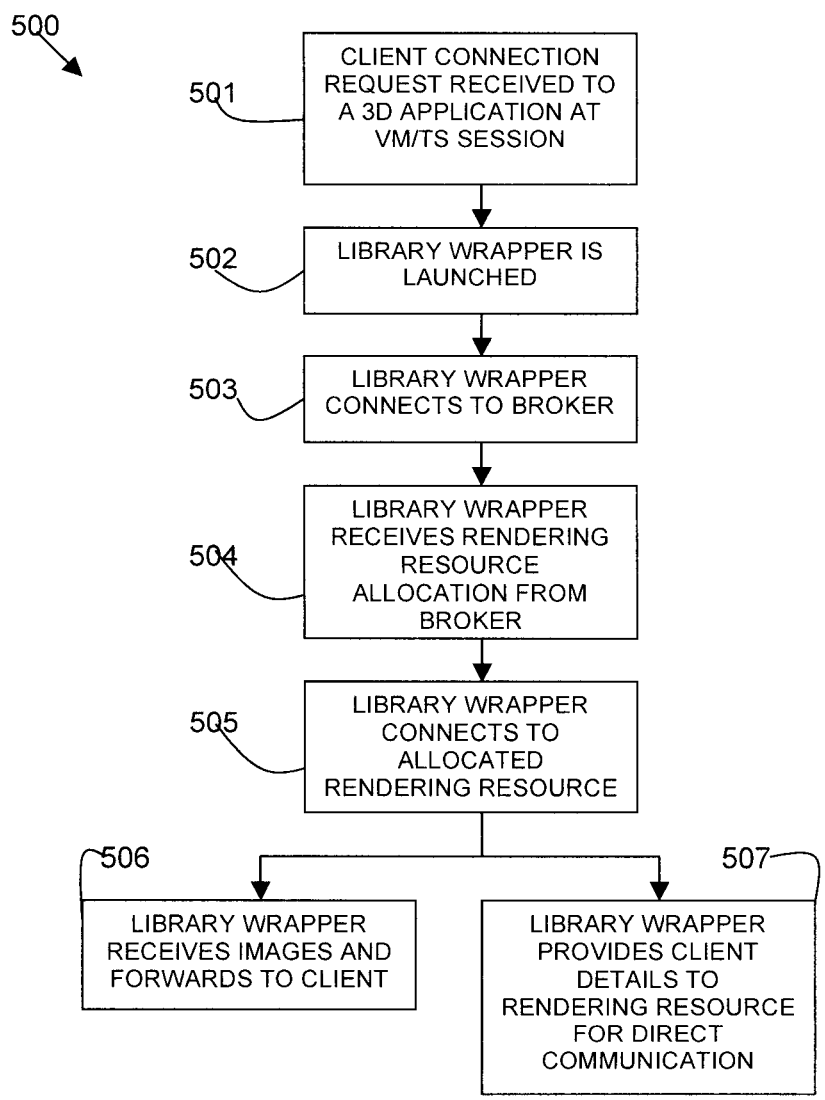
FIG. 5 is a flow diagram of a method in accordance with a further aspect of the present invention.

If extra connection information has not been provided for the remote client, the host based 3D library is instructed 414 to connect to the selected 3D graphics rendering resource and begin rendering. The runtime operation as described in FIG. 5 is then carried out.

Referring to FIG. 4B, a runtime operation 451 by the broker is shown. The broker maintains 452 connections to the host based 3D library and to the selected 3D graphics rendering resource. Monitoring 453 is carried out for rendering mode change or disconnection of any party (remote client, VM, rendering resource). It is determined 454 is there is a mode change. If disconnection is requested 455, all connections are closed down 456 and the 3D graphics rendering resource is cleaned up (i.e. if a party crashed).

If a mode change is requested 457, it is determined 458 if currently sending images directly to remote client. If so, the selected 3D graphics rendering resource is instructed 459 to send images to the host based 3D library over an established connection. The host based 3D library is instructed to receive frames and to send them to the remote client over a new connection. The method then loops 460 to continue monitoring 453.

If it is determined 458 that not currently sending images directly to remote client, the selected 3D graphics rendering resource is instructed 461 to connect directly to remote client and to start sending messages. The host based 3D library is not to expect any more frames from the 3D graphics rendering resource. The method then loops 462 to continue monitoring 453.

Referring to FIG. 5, a flow diagram 500 shows a method as carried out at a VM or TS session at a host. A remote client connection request is received 501 to a 3D application at a VM or TS session. A library wrapper for the application is launched 502 at the VM/TS session. The library wrapper connects 503 to the broker. The library wrapper receives 504 a 3D graphics rendering resource allocation from the broker. The library wrapper connects 505 to the allocated selected 3D graphics rendering resource. In one possible step, the library wrapper receives 506 images and forwards them to the remote client. In an alternative step, the library wrapper provides 507 client details to the selected 3D graphics rendering resource for direct communication.

The ability to effectively virtualize GPU compute power in a cloud is hugely advantageous as each GPU is often hundreds of times more computationally powerful than a standard CPU and consumes a fraction of the power and is a fraction of the cost. In the particular case of 3D graphics acceleration this virtualization would allow graphic capabilities on any device (e.g. a phone) which equals the most expensive dedicated graphics terminal essentially allowing anything up to photorealistic gaining, movies, CAD, etc. to operate where it would never have been possible before.

The cloud data centre contains a set of generic server machines that run the virtual system images, and a set of graphic servers, that only perform 3D rendering on behalf of the generic servers.

A new class of problem is introduced with GPU virtualization for 3D graphics acceleration workloads and specific issues arise, such as specific parametric load balancing and routing.

This described system focuses also on how to efficiently remotely visualize and use the applications by removing duplication of data exchange, and on how to select and balance usage of graphic hardware resources using a broker. The described system allows for sharing of 3D graphics rendering resources across multiple systems/applications.

The described system also includes encoding of 3D calls into a stream and the transfer of the stream to a different machine via a high speed network interface.

The invention solves the problem of the bottleneck that occurs at the VM from routing many instances of image streams whilst still allowing local access when needed.

The benefit of the described system is the provision of accelerated 3D graphics to applications running in a cloud-computing environment. This environment has traditionally been limited to 2D applications, or to slow software-only 3D rendering. Through the use of the described system, a limitation of the infrastructure of virtual machines and terminal services sessions not ordinarily having access to 3D hardware is overcome. By using a proxy wrapper library in place of the appropriate graphics API, the described system requires no modification to applications or awareness on their part that they are operating in the cloud environment at all. Compressing and sending the 3D images to the remote client allows remote interaction to the cloud enabled applications.

Remote access to the 3D applications is provided for remote client devices and does not require any 3D hardware on the remote client devices themselves. This makes the cloud approach to running 3D applications practical and centralises the hardware, ensuring maximum usage efficiency of those resources. The remote clients can interact with and work with applications and data far beyond the capabilities of their access device. Centralised applications allows the configuration and license sharing benefits of cloud to be leveraged.

Another benefit of this approach is scalability. The GPU provider hosts are not necessarily coupled to the hardware that is hosting the virtual machines/terminal services sessions.

As such, many VMs or sessions may be hosted on a single physical host and only those that require hardware accelerated 3D graphics will use such resources. A single large host machine may typically be capable of hosting tens or hundreds of VMs/sessions but may only be able to hold a maximum of one or two graphics adapters. This resource bottleneck will rapidly degrade the system's performance if more than a handful of VMs are attempting to make use of the graphics hardware.

With the described system, the graphics hardware is completely decoupled from the host machine and, through the use of a broker, an arbitrarily large number of GPU providers may be made available to service application's 3D graphics requirements. GPU providers may be assigned on a load-balanced basis using the broker. Additionally since the graphics hardware can be completely separated from the hardware hosting the virtual machines/terminal services sessions, extra capacity can be added without reconfiguration or replacement of the existing infrastructure.

Finally, the wrapper library running in the remote session may also directly write the 3D image into the local desktop of a VM/TS session if desired. This is useful, for example, should local console access be occurring, with or without remote access. This portion of the described system may simply be used to provide GPU acceleration to virtual machines, regardless of the use of 3D remote access. This is useful for workstations that might host several virtual machines locally and would like to have those VMs access 3D hardware. In this configuration all components could be located within a single physical machine. In such a case, the "remote client" may be provided on a virtual machine separate from the 3D hardware but within a single physical machine.

By using the broker mechanism to dynamically control the routing of the image streams the described system provides the following:

Improved resource allocation and scheduling through a combination of remote client requirements and currently available hardware capabilities and performance.

A solution to the traditional bottleneck at the VM/TS session host wherein large volumes of image data must be routed through a single point, thereby allowing cloud-level scalability.

Improved latency characteristics of individual VM/TS sessions and application's dynamic switching of image streams to route through the VM host or direct connection live migration of virtual machines between hosts whilst running a graphical application is possible.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
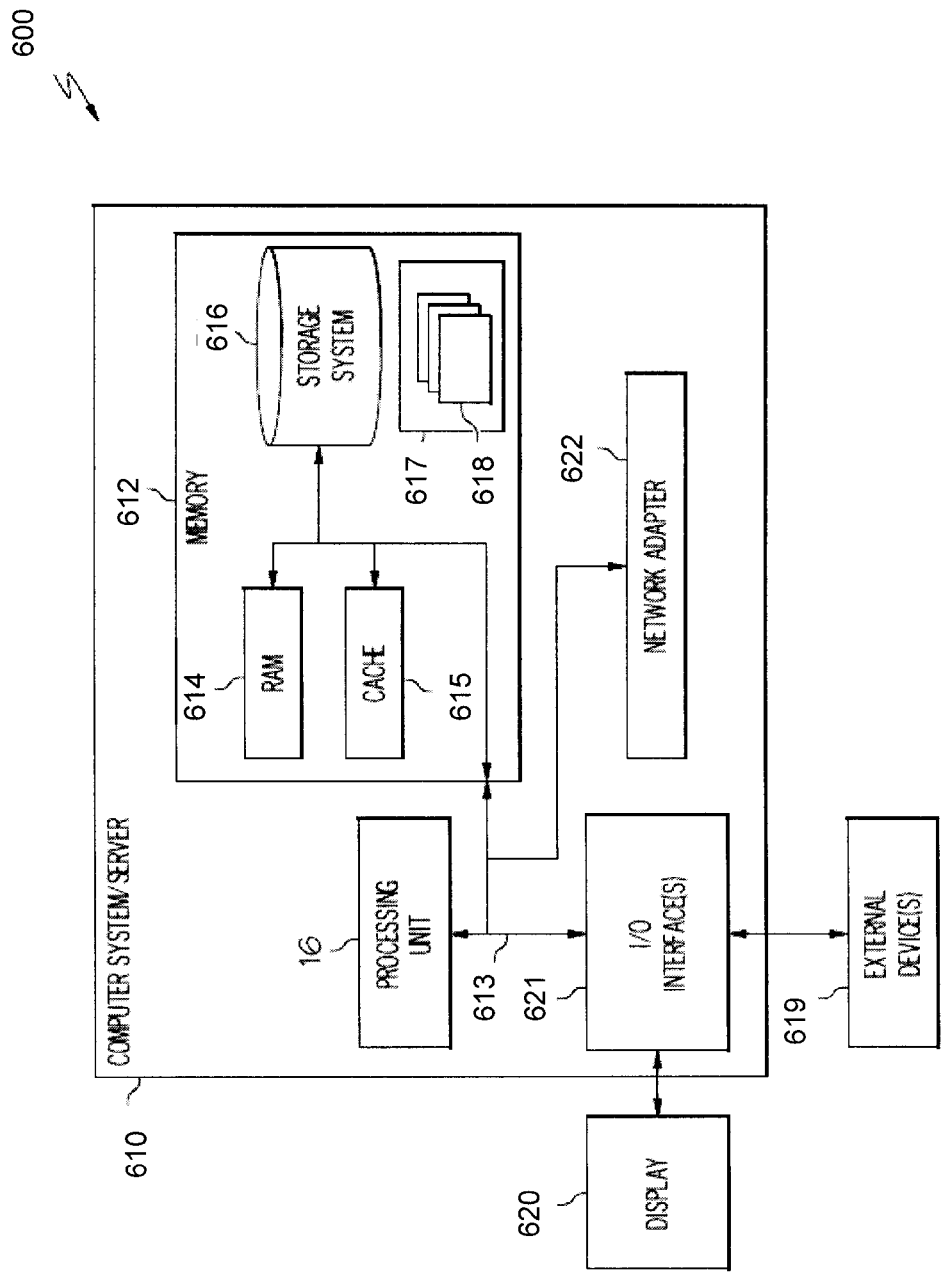
FIG. 6 is a block diagram of a computer system in which the present invention may be implemented.

Referring now to FIG. 6, a schematic of an example of a cloud computing node is shown. Cloud computing node 600 is only one example of a suitable cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 610, which is operational with numerous other general purpose or special purpose computing system environments or configurations. Examples of well-known computing systems, environments, and/or configurations that may be suitable for use with computer system/server 610 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 610 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 610 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 610 in cloud computing node 600 is shown in the form of a general-purpose computing device. The components of computer system/server 610 may include, but are not limited to, one or more processors or processing units 611, a system memory 612, and a bus 613 that couples various system components including system memory 612 to processor 611.

Bus 613 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 610 typically includes a variety of computer system readable media. Such media may be any available media that is accessible by computer system/server 610, and it includes both volatile and non-volatile media, removable and non-removable media.

System memory 612 can include computer system readable media in the form of volatile memory, such as random access memory (RAM) 614 and/or cache memory 615. Computer system/server 610 may further include other removable/non-removable, volatile/non-volatile computer system storage media. By way of example only, storage system 616 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 613 by one or more data media interfaces. As will be further depicted and described below, memory 612 may include at least one program product having a set (e.g., at least one) of program modules that are configured to carry out the functions of embodiments of the invention.

Program/utility 617, having a set (at least one) of program modules 618, may be stored in memory 612 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of embodiments of the invention as described herein.

Computer system/server 610 may also communicate with one or more external devices 619 such as a keyboard, a pointing device, a display 620, etc.; one or more devices that enable a user to interact with computer system/server 610; and/or any devices (e.g., network card, modem, etc.) that enable computer system/server 610 to communicate with one or more other computing devices. Such communication can occur via Input/Output (I/O) interfaces 621. Still yet, computer system/server 610 can communicate with one or more networks such as a local area network (LAN), a general wide area network (WAN), and/or a public network (e.g., the Internet) via network adapter 622. As depicted, network adapter 622 communicates with the other components of computer system/server 610 via bus 613. It should be understood that although not shown, other hardware and/or software components could be used in conjunction with computer system/server 610. Examples, include, but are not limited to: microcode, device drivers, redundant processing units, external disk drive arrays, RAID systems, tape drives, and data archival storage systems, etc.

Figure 7:
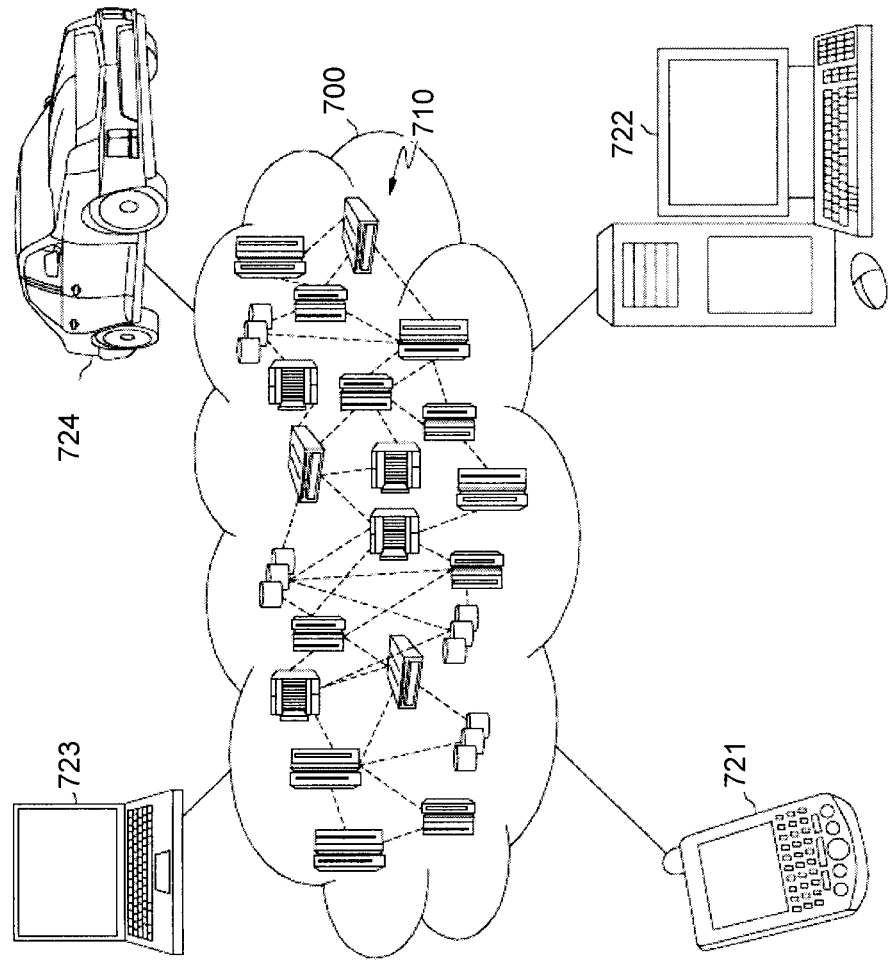
FIG. 7 is a schematic diagram of a cloud computing environment in which the present invention may be implemented.

Referring now to FIG. 7, illustrative cloud computing environment 700 is depicted. As shown, cloud computing environment 700 comprises one or more cloud computing nodes 710 with which local computing devices used by cloud consumers, such as, for example, personal digital assistant (PDA) or cellular telephone 721, desktop computer 722, laptop computer 723, and/or automobile computer system 724 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 721-724 are intended to be illustrative only and that computing nodes 710 and cloud computing environment 700 can communicate with any type of computerized device over any type of network and/or network addressable connection (e.g., using a web browser).

Figure 8:
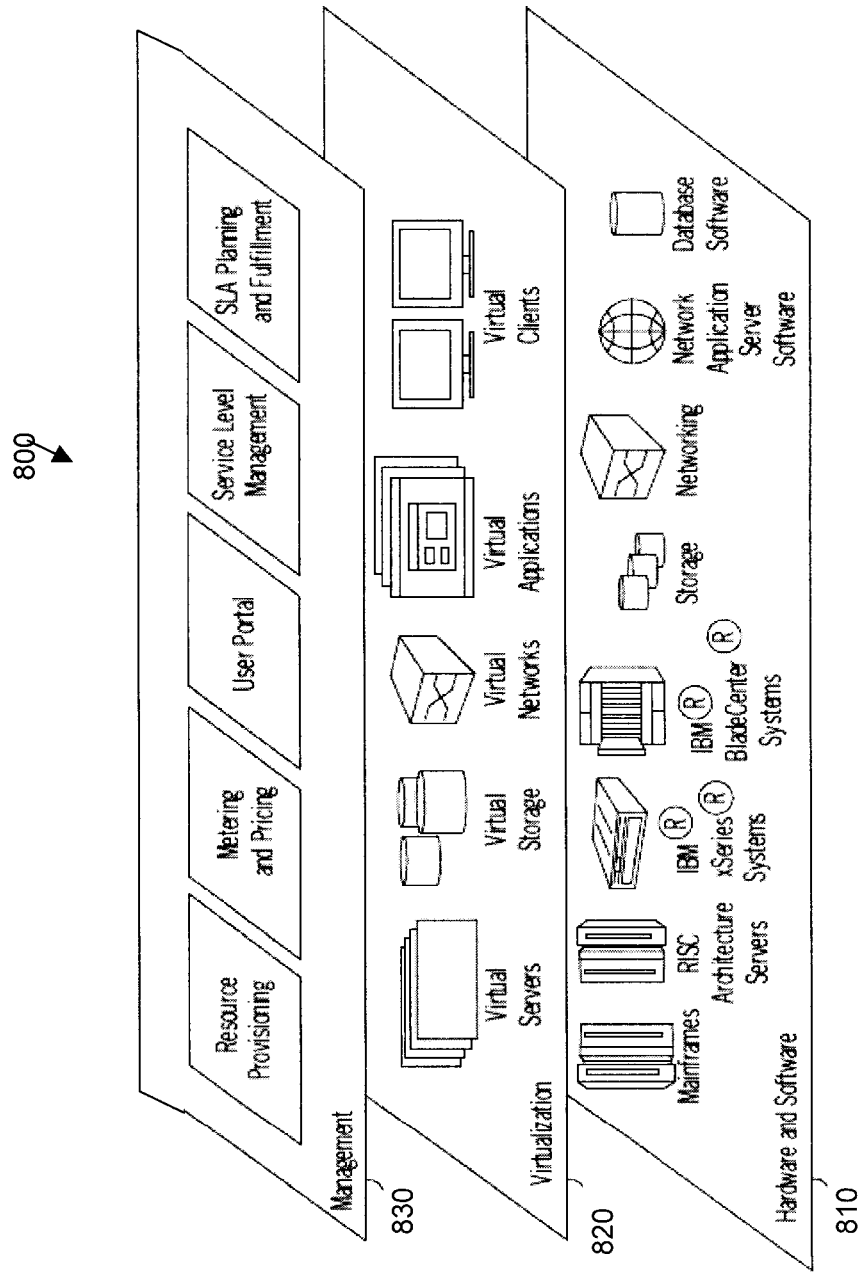
FIG. 8 is a schematic diagram of the layers of a cloud computing environment in which the present invention may be implemented.

Referring now to FIG. 8, a set of functional abstraction layers provided by cloud computing environment 800 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 810 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The hardware and software layer 810 is where the general servers hosting VMs/TS sessions and graphics servers or GPU providers are located.

Virtualization layer 820 provides an abstraction layer from which the following examples of virtual entities may be provided: virtual servers; virtual storage; virtual networks, including virtual private networks; virtual applications and operating systems; and virtual clients.

In one example, management layer 830 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The management layer 830 may provide the broker functionality for allocating graphic resources in the described system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for providing hardware accelerated graphics for network enabled applications, comprising:
   providing a network enabled application (221) on a host (120), the application (221) requiring hardware accelerated graphics not provided on the host (120);
   providing a 3D library wrapper (222) at the host (120) for connection to a broker (150) of 3D graphics rendering resources (141-144);
   receiving a request at the broker (150) for 3D graphics rendering resources (141-144);
   the broker (150) evaluating (304) available 3D graphics rendering resources (141-144) and allocating (305) a selected 3D graphics rendering resource (141) from the 3D graphics rendering resources (141-144) to the 3D library wrapper (222), in order to return final 2D rendered images to a remote client (131);
   the broker (150) determining (412) if direct connection information for the remote client (131) is provided; and
   if there is direct connection information for a remote client, instructing (413) the selected 3D graphics rendering resource (141) to make direct connection with the remote client (131);
   the 3D library wrapper (222) providing direct connection information to the 3D graphics rendering resources (141-144);
   the selected 3D graphics rendering resource (141) sending (308) final rendered images directly to the remote client (131);
   the broker (150) monitoring (454) a mode change request between direct communication between the selected 3D graphics rendering resource (141) and the remote client (131) and communication via the 3D library wrapper (222); and
   performing one of changing mode (457) and disconnection (455) as required;
   if mode change is for disconnection (455), closing down (456) all connections and cleaning up rendering resource, forcing an update of resource priority queue due to freed resources;
   if mode change is requested (457) and currently sending directly to client (458), then instructing rendering resource to send images to VM based 3D library over established connection and instructing VM based 3D library to receive frames and send them to the client over a new connection (459); and if mode change is requested (457) and not currently sending directly to client, then (461) instructing rendering resource to connect directly to client and start sending images, and instructing VM based 3D library not to expect any more frames from the rendering resource.

2. The method as claimed in claim 1, wherein the network enabled application (221) executes on a virtual machine (121) on the host (120) and is accessed by the remote client (131).

3. The method as claimed in claim 1, wherein the network enabled application (221) executes on a terminal services session on the host (120) and is accessed by the remote client (131).

4. The method as claimed in claim 1, including:
the 3D library wrapper (222) and the selected 3D graphics rendering resource (141) connecting to send graphical calls.

5. The method as claimed in claim 1, including:
sending (307) final rendered images from the selected 3D graphics rendering resource (141) to the 3D library wrapper (222) for forwarding to the remote client (131).

6. The method as claimed in claim 1, wherein multiple 3D graphics rendering resources (141-144) are provided as virtualized graphics servers provided in a network computing architecture available to multiple virtual machines or terminal services sessions (121-125) on one or more hosts (120).

7. The method as claimed in claim 1, including:
the broker (150) monitoring (405) 3D graphics rendering resources (141-144) and updating (408) a resource priority queue (409).

8. The method as claimed in claim 1, including:
modifying 3D graphics calls to a neutral format between the 3D library wrapper (222) and the selected 3D graphics rendering resource (141).

9. The method as claimed in claim 1, wherein decoupling graphics rendering from the host (120) enables scalability of graphics resources with platform independence.

10. A computer program on a tangible non-transitory media comprising computer program code to, when loaded into a computer system and executed, perform all the steps of the method according to claim 1.

11. A system for providing hardware accelerated graphics for network enabled applications, comprising:
a host (120) having an application (221) requiring hardware accelerated graphics not provided on the host (120) and a 3D library wrapper (222) for the application (221);
one or more 3D graphics rendering resources (141-144) provided independently of the host (120);
a broker (150) for evaluating (304) and allocating (305) a selected 3D graphics rendering resource (141) selected from the one or more 3D graphics rendering resources (141-144) to the 3D library wrapper (222) for the application (221), in order to return final 2D rendered images to a remote client (131);
a direct communication mechanism to the remote client (131) from the selected 3D graphics rendering resource (141);
wherein the broker (150) determines (412) if direct connection information for the remote client (131) is provided; and, if there is direct connection information for the remote client (131), instructs (413) the selected 3D graphics rendering resource (141) to make direct connection with the remote client (131); and
wherein the remote client (131) receives rendered images directly from the selected 3D graphics rendering resource (141) and composites the images at the client (131);
wherein the broker (150) monitors (454) a mode change request between direct communication between the selected 3D graphics rendering resource (141) and the remote client (131) and communication via the 3D library wrapper (222) and performs one of changing mode (457) and disconnecting (455) as required;
if mode change is for disconnection (455), closing down (456) all connections and cleaning up rendering resource, forcing an update of resource priority queue due to freed resources;
if mode change is requested (457) and currently sending directly to client (458), then instructing rendering resource to send images to VM based 3D library over established connection and instructing VM based 3D library to receive frames and send them to the client over a new connection (459); and
if mode change is requested (457) and not currently sending directly to client, then (461) instructing rendering resource to connect directly to client and start sending images, and instructing VM based 3D library not to expect any more frames from the rendering resource.

12. The system as claimed in claim 11, wherein the 3D library wrapper (222) is a proxy library wrapper directing library calls to the broker (150).

13. The system as claimed in claim 11, wherein the application (221) executes on a virtual machine (121) on the host (120) and is accessed by the remote client (131).

14. The system as claimed in claim 11, wherein the application (221) executes on a terminal services session on the host and is accessed by the remote client (131).

15. The system as claimed in claim 11, wherein:
the broker (150) evaluates (304) and allocates (305) virtualized 3D graphics rendering resources to multiple hosts (120) in a network enabled environment.

16. The system as claimed in claim 11, including:
a communication mechanism between the 3D library wrapper (222) and the selected 3D graphics rendering resource (141) to send neutral graphical calls.

17. The system as claimed in claim 11, wherein the broker (150) monitors (405) 3D graphics rendering resources (141-144) and updates (408) a resource priority queue (409).

18. The system as claimed in claim 11, wherein decoupling graphics rendering from the host (120) enables scalability of graphics resources with platform independence.

19. The system as claimed in any claim 11, wherein the remote client (131) is a thin client and the system supports multiple connection protocols.

20. The system as claimed in claim 11, wherein the host (120) hosts multiple virtual machines (121-125) and displays the rendered images locally.

\* \* \* \* \*